(12) United States Patent
Kwon et al.

(10) Patent No.: US 8,654,745 B2
(45) Date of Patent: Feb. 18, 2014

(54) TECHNIQUE FOR SIGNAL TRANSMISSION MODE DETERMINATION IN WIRELESS COMMUNICATION SYSTEM AND APPARATUS FOR SAME

(75) Inventors: Yeong Hyeon Kwon, Gyeonggi-do (KR); Seung Hee Han, Gyeonggi-do (KR); Hyun Woo Lee, Gyeonggi-do (KR); Sung Ho Moon, Gyeonggi-do (KR); Jin Sam Kwak, Gyeonggi-do (KR); Dong Cheol Kim, Gyeonggi-do (KR); Min Seok Noh, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 13/126,460

(22) PCT Filed: Oct. 26, 2009

(86) PCT No.: PCT/KR2009/006183
§ 371 (c)(1),
(2), (4) Date: Apr. 27, 2011

(87) PCT Pub. No.: WO2010/050712
PCT Pub. Date: May 6, 2010

(65) Prior Publication Data
US 2011/0211488 A1    Sep. 1, 2011

Related U.S. Application Data

(60) Provisional application No. 61/108,555, filed on Oct. 27, 2008.

(30) Foreign Application Priority Data

Dec. 31, 2008 (KR) ........................ 10-2008-0138081

(51) Int. Cl.
*H04J 3/00* (2006.01)
*H04J 1/00* (2006.01)
*H04W 72/00* (2009.01)

(52) U.S. Cl.
USPC .................. 370/336; 370/343; 455/452.2

(58) Field of Classification Search
None
See application file for complete search history.

(56) References Cited

U.S. PATENT DOCUMENTS

| 2005/0232156 | A1  | 10/2005 | Kim et al. |
| 2005/0233754 | A1* | 10/2005 | Beale ........................ 455/452.2 |
| 2006/0013182 | A1* | 1/2006  | Balasubramanian et al. 370/343 |
| 2006/0255989 | A1* | 11/2006 | Kim et al. ..................... 341/120 |
| 2008/0075032 | A1* | 3/2008  | Balachandran et al. ...... 370/317 |
| 2009/0067391 | A1* | 3/2009  | Shen et al. .................... 370/336 |
| 2010/0074164 | A1* | 3/2010  | Hart et al. ..................... 370/315 |

FOREIGN PATENT DOCUMENTS

| KR | 1020070074708 | 7/2007 |
| KR | 1020080063629 | 7/2008 |
| WO | WO2008056095 | * 5/2008 ............... H04L 1/00 |

* cited by examiner

*Primary Examiner* — Melanie Jagannathan
(74) *Attorney, Agent, or Firm* — Lee, Hong, Degerman, Kang & Waimey

(57) ABSTRACT

The present invention relates to a method for determining the transmission mode in a wireless communication system. More specifically, the present invention relates to a method for transmission mode determination in a wireless communication system, comprising a step wherein feedback information regarding channel status is received, and a step wherein it is determined based on said feedback information whether a transmission signal will be transmitted via each of a fixed number of subcarriers, after applying a propagation sequence.

8 Claims, 10 Drawing Sheets

FIG. 5
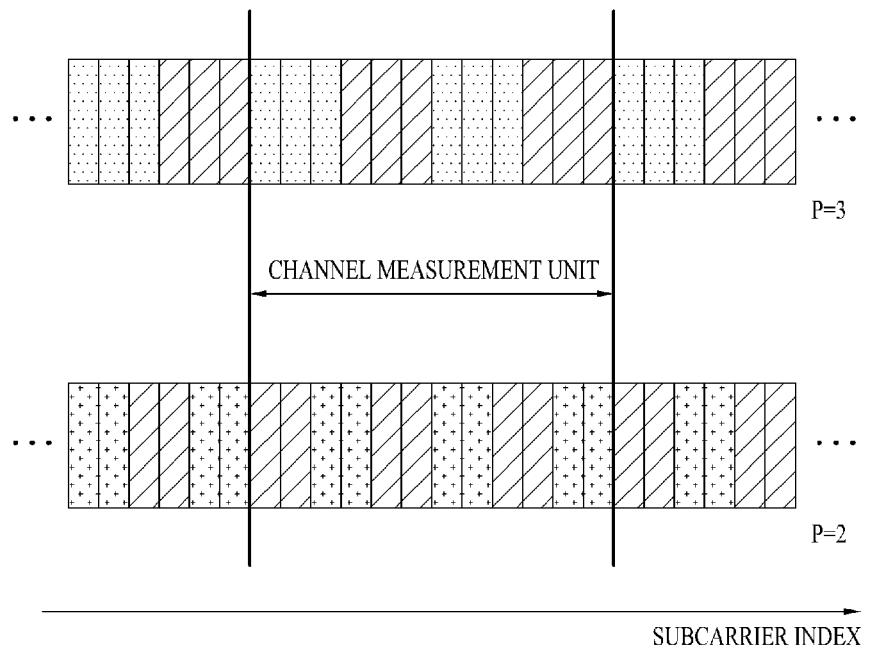
(a)
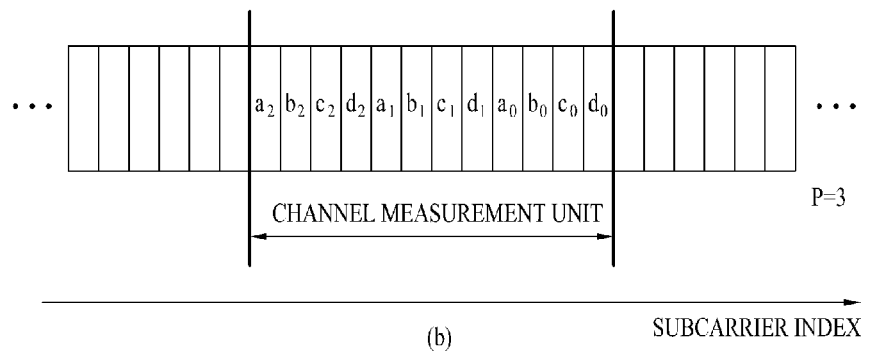
(b)

TECHNIQUE FOR SIGNAL TRANSMISSION MODE DETERMINATION IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2009/006183, filed on Oct. 26, 2009, which claims the benefit of earlier filing date and right of priority to Korean Application No. 10-2008-0138081, filed on Dec. 31, 2008, and also claims the benefit of U.S. Provisional Application Ser. No. 61/108,555, filed on Oct. 27, 2008, the contents of all of which are incorporated by reference herein in their entirety.

TECHNICAL FIELD

The present invention relates to a wireless communication system, and more particularly, to a method and apparatus for determining a transmission mode in a wireless communication system.

BACKGROUND ART

In a cellular wireless communication system, radio resources are shared between adjacent cells. Therefore, interference occurs to different UEs located in the adjacent cells in the cellular wireless environment, thereby rapidly decreasing the performance of cell-edge UEs. Despite the same channel gain, the capacity of a cell-edge UE is rapidly changed depending on whether a UE uses the same resources in a neighbor cell. In general, the capacity of a channel is determined by $$C=\log_2(1+|h|^2 \times SINR) \quad \text{[Equation 1]}$$

where C represents the channel capacity, $|h|$ represents a channel gain, and SINR represents a signal to interference and noise ratio.

That is, no matter how good the channel is, the actual capacity that the UE can achieve is determined by the SINR of a signal received from a BS. This relationship similarly applies to downlink as well as uplink. For example, when the BS transmits a signal to a cell-edge UE, interference from a neighbor cell limits the total capacity of the UE as in [Equation 1], even though the channel between the UE and the BS is in good state.

To avert this problem, a wireless communication system allocates resources to adjacent cells through fractional frequency reuse, fixed reuse, etc. such that they are not overlapped between the adjacent cells. That is, an environment is built in which radio resources used by a specific cell-edge UE are not used in a neighbor cell. Aside from a method for limiting use of radio resources, soft frequency reuse is also considered, which has the same effects only through power control. Although soft frequency reuse is similar to fractional frequency reuse, the former may provide a service to UEs within a cell by reducing power in a frequency area overlapped with the neighbor cell, rather than the frequency area is not used at all. However, if frequency resources are segmented for each cell, the total bandwidth of the system is decreased, which limits an achievable maximum throughput irrespective of the actual situation of the neighbor cell. On the other hand, SDMA (spatial diversity multiple access) using multiple antennas is under consideration. In SDMA, interference can be reduced by receiving a target signal with interference from the neighbor cell minimized through beamforming according to the location of a UE. However, its complex signaling and imperfect coordination may lead to the degradation of overall performance. The most passive method for handling neighbor cell interference is to design radio resources into a cell-specific configuration for each cell. However, this method is effective only when each cell has a small amount of traffic, but does not present a basic solution to interference.

DISCLOSURE

Technical Problem

An object of the present invention devised to solve the conventional problem is to provide a method and apparatus for increasing the throughput of a UE by effectively reducing inter-cell interference in a wireless communication system.

Another object of the present invention is to provide a method and apparatus for actively cancelling inter-cell interference in a wireless communication system.

A further object of the present invention is to provide a method and apparatus for efficiently transmitting control information required for active cancellation of inter-cell interference.

It will be appreciated by persons skilled in the art that the objects that could be achieved with the present invention are not limited to what has been particularly described hereinabove and the above and other objects that the present invention could achieve will be more clearly understood from the following detailed description.

Technical solution

In an aspect of the present invention, a method for determining a transmission mode in a wireless communication system includes receiving feedback information about a channel state, and determining based on the feedback information whether to transmit a transmission signal on a subcarrier basis or to apply a spreading sequence to the transmission signal and transmit the transmission signal on a predetermined number of subcarriers basis.

In another aspect of the present invention, a method for reporting a channel state in a wireless communication system includes receiving a plurality of subcarriers, determining a channel state by applying a spreading sequence on a predetermined number of subcarriers basis, and transmitting information about the channel state.

In another aspect of the present invention, a transmitter in a wireless communication system includes a Radio Frequency (RF) unit configured to transmit and receive signals to and from a receiver, and a processor configured to process a received signal and generate a signal to be transmitted to the receiver. The processor receives feedback information about a channel state, and determines based on the feedback information whether to transmit a transmission signal on a subcarrier basis or to apply a spreading sequence to the transmission signal and transmit the transmission signal on a predetermined number of subcarriers basis.

In a further aspect of the present invention, a transmitter in a wireless communication system includes a Radio Frequency (RF) unit configured to transmit and receive signals to and from a receiver, and a processor configured to process a received signal and generate a signal to be transmitted to the receiver. The processor receives a plurality of subcarriers from the receiver, determines a channel state by applying a spreading sequence on a predetermined number of subcarriers basis, and transmits information about the channel state to the receiver. The transmitter is a part of a UE and the receiver is a part of a BS for uplink. On the contrary, the transmitter is a part of a BS and the receiver is a part of a UE for downlink.

Advantageous Effects

Embodiments of the present invention have the following effects.

Firstly, the throughput of a UE can be increased by effectively reducing inter-cell interference in a wireless communication system.

Inter-cell interference can be actively cancelled in the wireless communication system.

Thirdly, control information needed to actively cancel inter-cell interference can be efficiently transmitted.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates an exemplary structure of radio resources, when aggregation is used.

BEST MODE FOR CARRYING OUT THE INVENTION

The configuration, operation, and other features of the invention will become apparent to those having ordinary skill in the art upon examination of the following embodiments of the present invention described with reference to the attached drawings. The embodiments of the present invention as set forth herein are examples in which the technical features of the present invention are applied to an orthogonal frequency division multiple access (OFDMA) system.

Figure 1:
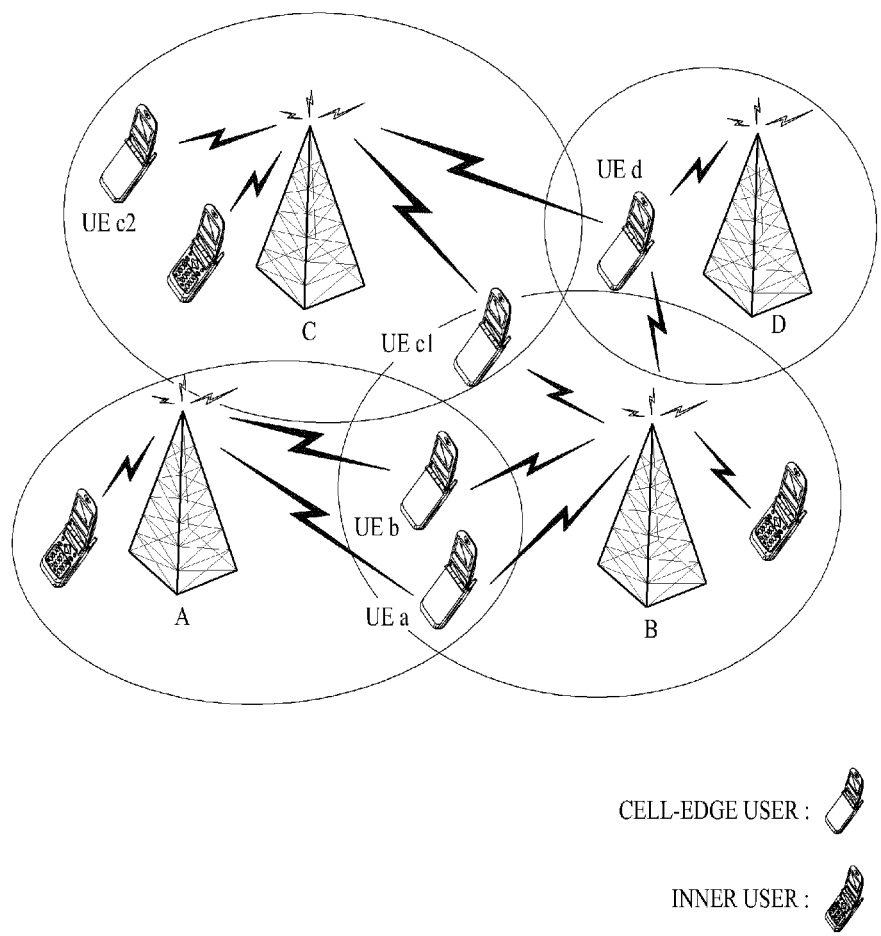
FIG. 1 illustrates an example in which a specific UE receives a service from at least one BS according to the location of the UE within a cell in a multi-cellular environment.

FIG. 1 illustrates an example in which a specific UE receives a service from at least one BS according to the location of the UE within a cell in a multi-cellular environment.

Referring to FIG. 1, UE a is located at the edge of Cell A and receives a service from Cell A. However, because UE a also belongs to the edge of Cell B, it may be affected by Cell B. Similarly, UE b is located at the edge of Cell B and receives a service from Cell B. However, because UE b also belongs to the edge of Cell A, it may be affected by Cell A. While UE c1 is at the edge of Cell C and receives a service from Cell C, it also belongs to the edge of Cell B and thus may be affected by Cell B. Although UE c2 is at the edge of Cell C and receives a service from Cell C, it may be affected by another neighbor cell which is not shown, because it also belongs to the edge of the neighbor cell. UE d is located at the edge of Cell D and thus receives a service from Cell D. However, because UE d is also at the edges of Cell B and Cell C, it may be affected by Cell B and Cell C. That is, each of UE a, UE b, UE c1, UE c2 and UE d is located at the boundary between at least two cells and thus simultaneously affected by the neighbor cells. Therefore, the UEs may experience a decrease in the throughput of received service data due to co-channel interference caused by the neighbor cells. On the other hand, inner users illustrated in FIG. 1 are not affected by the neighbor cells.

To cancel neighbor cell interference, fractional frequency reuse, fixed reuse, soft frequency reuse, and SDMA using multiple antennas are under consideration. However, because these passive methods are effective only when there is a small amount of traffic, they do not provide a fundamental solution to inter-cell interference. Accordingly, there exists a need for a method for actively cancelling interference from a neighbor cell.

Now a detailed description will be given below of a method for actively cancelling inter-cell interference.

It is assumed that a transmission signal is spread with a spreading sequence of length P and then transmitted on P subcarriers having similar channel responses. As described above, transmission of a spread transmission signal in units of a predetermined number of subcarriers is referred to as subcarrier aggregation or shortly aggregation in the present invention. In both cases of no processing of a subcarrier group with P subcarriers and interference cancellation from a subcarrier group with P subcarriers, the channel capacities may be placed in the following relationship.

$$p \times \log_2(1+|h|^2 \times \text{SINR}) < \log_2(1+P \times |h|^2 \times \text{SNR}) \quad \text{[Equation 2]}$$

where |n| represents a channel gain, SINR represents a signal to interference and noise ratio, and SNR represents a signal to noise ratio.

With respect to SINR, the above equation may be expressed as follows.

$$\text{SINR} < 1/|h|^2 \times (1+P \times |h|^2 \times \text{SNR})^{1/P} \quad \text{[Equation 2]}$$

where |h|, SINR and SNR have been described before.

Figure 2:
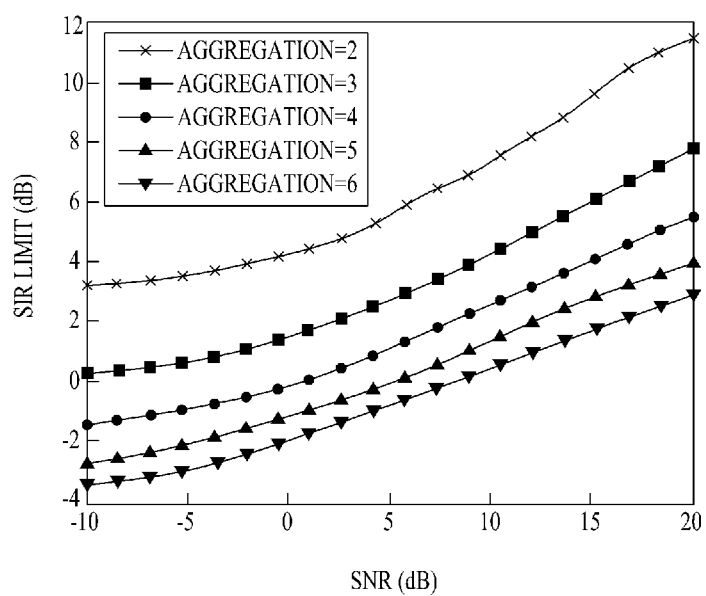
FIG. 2 illustrates a maximum SIR value that offers a gain through aggregation at a specific SNR.

FIG. 2 illustrates maximum SIRs satisfying [Equation 3]. A maximum SIR gain that can be achieved through subcarrier aggregation at a specific SNR is known from FIG. 2.

Referring to FIG. 2, if interference can be eliminated through aggregation of two or three subcarriers (P subcarriers), a capacity gain can be obtained almost in an entire operation range. However, as the number P of subcarriers for aggregation increases, SIR is decreased to achieve a gain. That is, a gain can be obtained only in an area experiencing severe interference. For example, it is assumed that two UEs are located at a cell boundary in a 2-cell model. Referring to FIG. 2, if P=2, a gain may be be obtained in an entire SNR area. A gain may be obtained at an SNR of about −10 dB for P=3, at an SNR of about 1 dB for P=4, at an SNR of about 6 dB for P=5, and at an SNR of about 10 dB for P=6. According to this capacity analysis, the same system performance as in case of FFR can be achieved despite a frequency reuse factor of 1, only if interference can be cancelled through subcarrier aggregation.

Figure 3:
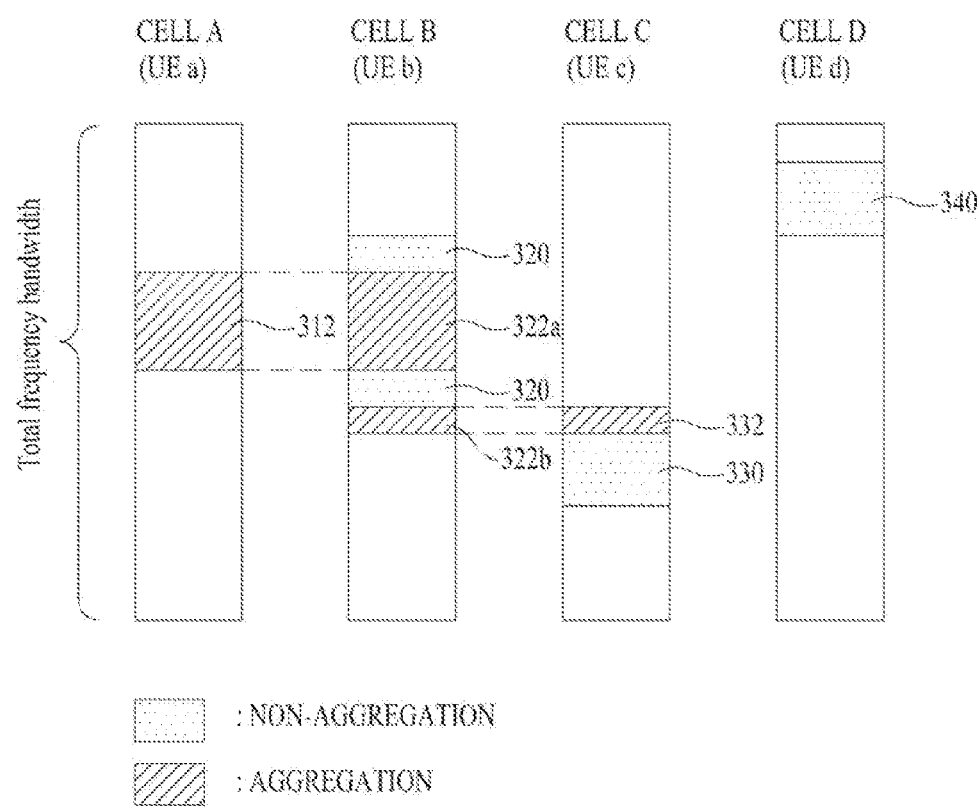
FIG. 3 illustrates an example of applying subcarrier aggregation to FIG. 1 according to an embodiment of the present invention.

FIG. 3 illustrates an example of applying subcarrier aggregation to FIG. 1 according to an embodiment of the present invention. A basic communication environment is assumed to be same as illustrated in FIG. 1. Unlike FIG. 1, FIG. 3 is based on the assumption that only one UE is located in each cell. Thus, it is assumed that only UE c1 exists in Cell C.

Referring to FIG. 3, rectangles under Cell A to Cell D represent total frequency bands allocated to Cell A to Cell D, respectively. In the embodiment of the present invention illustrated in FIG. 3, Cell A to Cell D may use the allocated whole frequency bands. That is, Cell A to Cell D operate with a frequency reuse factor of 1. Hashed parts of the frequency bands allocated to Cell A to Cell D represent frequency resources used to service UE a, UE b, UE c1 and UE d, respectively. Referring to FIGS. 1 and 3, UE a and UE b are located at the boundary between Cell A and Cell B and receive services in the same frequency resources. Therefore, BSs of Cell A and Cell B use subcarrier aggregation for frequency resources 312 and 322 common to UE a and UE b among resources used for UE a and UE b. As the BSs of Cell A and Cell B provide services to UE a and UE b through subcarrier aggregation of the overlapped frequency resources, UE a and UE b can achieve a capacity gain. Likewise, UE b and UE c1 are located at the boundary between Cell B and Cell C and receive services in the same frequency resources. Therefore, BSs of Cell B and Cell C use subcarrier aggregation for frequency resources 323 and 332 common to UE b and UE c1 among resources used for UE b and UE c1. However, a part of the frequency band in which Cell B provides a service to UE b is not related to UE a and UE c1. Therefore, the BS of Cell B does not use subcarrier aggregation for a part 330 of resources used for UE b. In Cell D, none of the frequency resources in which UE d is serviced are overlapped with the current frequency resources of neighbor cells. Hence, a BS of Cell D does not apply subcarrier aggregation to any of the frequency resources used for UE d.

In this context, the present invention provides a mechanism for improving a maximum throughput in terms of which FFR is not advantageous, while reducing the effects of interference. Specifically, a transmission mode determination method in a wireless communication system according an aspect of the present invention includes a step for receiving feedback information about a channel state and a step for determining whether to transmit a transmission signal on a subcarrier basis or to spread the transmission signal with a spreading sequence and transmit the spread signal in units of a predetermined number of subcarriers. The feedback information may be related to a channel state determined by applying the spreading sequence to the predetermined number of subcarriers. The feedback information may also include at least one of a CQI (channel quality indicator), an SINR (signal to interference and noise ratio), an SIR (signal to interference ratio), an SNR (signal to noise ratio), and an MCS (modulation and coding scheme) table index.

In addition to conventional information about a modulation order and channel coding, an MCS table may further include aggregation information. For example, the MCS table may further include information about the number of aggregated subcarriers (e.g. P=1, 2, 3, . . . ). A new MCS table may further include aggregation information for every modulation/coding combination. However, when a UE is located at a cell edge, a problem may actually occur. If a UE is located at a cell edge, a high modulation order and a high code rate are not viable in many cases. Therefore, the MCS table may further include aggregation information only for a case with a low modulation order and a low code rate. That is, the MCS table may further include aggregation information only for some combinations with low modulation orders/low code rates. In this case, a UE may measure regarding aggregation all the time by transmitting an MCS table index during CQI measurement. In this case, if a neighbor cell uses aggregation and interferes much with the UE, the UE can achieve a higher channel capacity by measuring CQI through aggregation.

To generate the feedback information, the UE or the BS may evaluate the quality of a transmission signal. The transmission signal quality may include interference information. In addition, the UE or the BS may calculate an SIR through interference measurement and an SNR through noise level measurement. The feedback information may include information about a transmission signal quality that has been measured through per subcarrier processing. Preferably, the feedback information may include information about a transmission signal quality measured by applying a spreading sequence to each subcarrier group including a predetermined number of subcarriers ('aggregation-based method'). The predetermined number of subcarriers may be contiguous or distributed in the frequency domain.

Preferably, the predetermined number of subcarriers are contiguous in the frequency domain. The information about a transmission signal quality measured by applying a spreading sequence to each subcarrier group with the predetermined number of subcarriers is used to determine whether to mitigate interference through aggregation in determining a transmission mode. Therefore, the UE or the BS may additionally measure a CQI based on aggregation, without depending on normal CQI measurement as done in a conventional method (i.e. determination of an appropriate MCS level based on an SINR). Or a part for controlling a transmission mode may additionally estimate a CQI for an aggregated frequency band. When a CQI is measured, aggregation may or may not be uniformly applied to a total measurement band. However, if a frequency band is divided for each cell according to a preset rule and a specific cell can use a specific frequency band independently, there is no need for applying aggregation to the specific frequency band. Accordingly, it may be contemplated that aggregation is applied to a particular frequency band, not to the remaining frequency band of a CQI measurement frequency band.

For example, on the assumption of one frequency band to be measured includes n subcarriers, a basic value for CQI measurement is calculated according to the following equation.

$$SINR = \sum_{k=0}^{n-1} s_k^2 \bigg/ \sum_{k=0}^{n-1} (I_k^2 + N_k^2) \qquad \text{[Equation 4]}$$

where S represents the signal strength of a subcarrier, I represents the strength of interference with the subcarrier, N represents the strength of noise on the subcarrier, and k represents the index of the subcarrier.

When an SINR is measured through aggregation, it is estimated by multiplying a masking sequence 'c' as follows.

$$SINR_c = \sum_{k=0}^{n/p-1}\left(\sum_{j=0}^{p-1}c_j s_{kp+j}\right)^2 \Bigg/ \sum_{k=0}^{n/p-1}\left(\sum_{j=0}^{p-1}c_j(I_{kp+j}+N_{kp+j})\right)^2 \quad \text{[Equation 5]}$$

where c represents a masking sequence of length p, S represents the signal strength of a subcarrier, I represents the strength of interference with the subcarrier, N represents the strength of noise on the subcarrier, p represents the number of aggregated subcarriers, k represents the index of a subcarrier group including a predetermined number of subcarriers, and j is an integer ranging from 0 to p−1.

The masking sequence is a kind of spreading sequence. Masking sequences may be mutually orthogonal. However, to accommodate more UEs, the masking sequences may be sequences which are not orthogonal but have small cross-correlations. For example, the masking sequences may be perfectly orthogonal sequences such as ZC (Zadoff Chu), CAZAC (Constant Amplitude Zero Autocorrelation Waveform), walsh, DFT (discrete fourier transform) sequences, etc. The masking sequences may also be a PN (pseudo noise) sequence family with small cross-correlations. Considering that it is usually difficult to have a large p value with a sequence having a small cross-correlation, it is preferable to use orthogonal sequences. Among these sequences, a sequence format may be defined in such a manner that whether a subcarrier is used or not is indicated. For example, a masking sequence may be defined such that if a sequence code bit value is non-zero, it indicates signal transmission and if the sequence code bit is zero, it indicates non-signal transmission. For instance, if P=2, masking sequences may be defined as $\{1, 0\}$ and $\{0, 1\}$. If P=3, masking sequences may be defined as $\{1, 0, 0\}$, $\{0, 1, 0\}$ and $\{0, 0, 1\}$. Both amplitude modulation and phase modulation may be allowed for a corresponding subcarrier at a subcarrier position with a non-zero value.

A ZC sequence is a kind of orthogonal sequence, CAZAC sequence. A complex value corresponding to each position k of each ZC sequence u may be expressed as $$d^u(k) = \exp\left\{-j\frac{\pi k(k+1)}{N_{ZC}}\right\} \quad \text{[Equation 6]}$$

where $0 \leq k \leq N_{ZC}-1$ and $N_{ZC}$ represents a sequence length.

Exemplary walsh sequences of length 2 may be given as $\{1, 1\}$ and $\{1, -1\}$ and exemplary walsh sequences of length 4 may be given as $\{1, 1, 1, 1\}$, $\{1, -1, 1, -1\}$, $\{1, 1, -1, -1\}$ and $\{1, -1, -1, 1\}$. Walsh sequences of a longer length may be defined in a similar manner.

When it is possible to coordinate setting of masking sequences through communication between BSs, a BS may transmit information about a corresponding masking sequence to a UE on a control channel. For example, the masking sequence information may specify a masking sequence id or a masking sequence set. In this case, the BS should transmit information about a masking sequence to the UE. Therefore, a cell-specific masking sequence may be defined to facilitate system implementation. For instance, a masking sequence id (or masking sequence ids) available for each cell may be determined using identification information such as a cell id, a sector id, etc. which distinguishes the cell from a neighbor cell.

In addition, if communication is unavailable between the BSs, the UE may perform the operation described as [Equation 5] on all or at least a part of masking sequences included in a masking sequence set $C^P$ $\{C\ c^0, c^1, c^2, \ldots C^m\}$ preserved in the UE. Herein, 'c' represents a masking sequence of P, P is 2 or a larger integer, and M is 1 or a larger integer. A plurality of masking sequence sets $C^P$ may exist according to P. That is, there may be both a masking sequence set with P=2 and a masking sequence set with P=3. If the UE performs the operation described as [Equation 5] using masking sequences, the UE may autonomously select a masking sequence that offers the best performance. In this case, the UE preferably feeds back an SINR value that is achieved when the masking sequence is used, together with information about the corresponding masking sequence.

As described above, when the UE calculates a CQI using a masking sequence, the BS may configure a transmission mode offering a higher capacity by comparing a normal CQI (i.e. P=1) with a CQI obtained through aggregation (i.e. P>1). In this context, when a neighbor cell also uses a masking sequence, the use of orthogonal masking sequences between neighbor cells may lead to the highest SINR. Accordingly, the channel capacity may be increased as in [Equation 2]. On the part of the system, it can increase cell-edge performance by setting a frequency reuse factor to 1 but, when needed, by using a transmission mode with aggregation in a specific band. On the other hand, if aggregation is not used (i.e. P=1), each cell may transmit information on a subcarrier basis.

Figure 4:
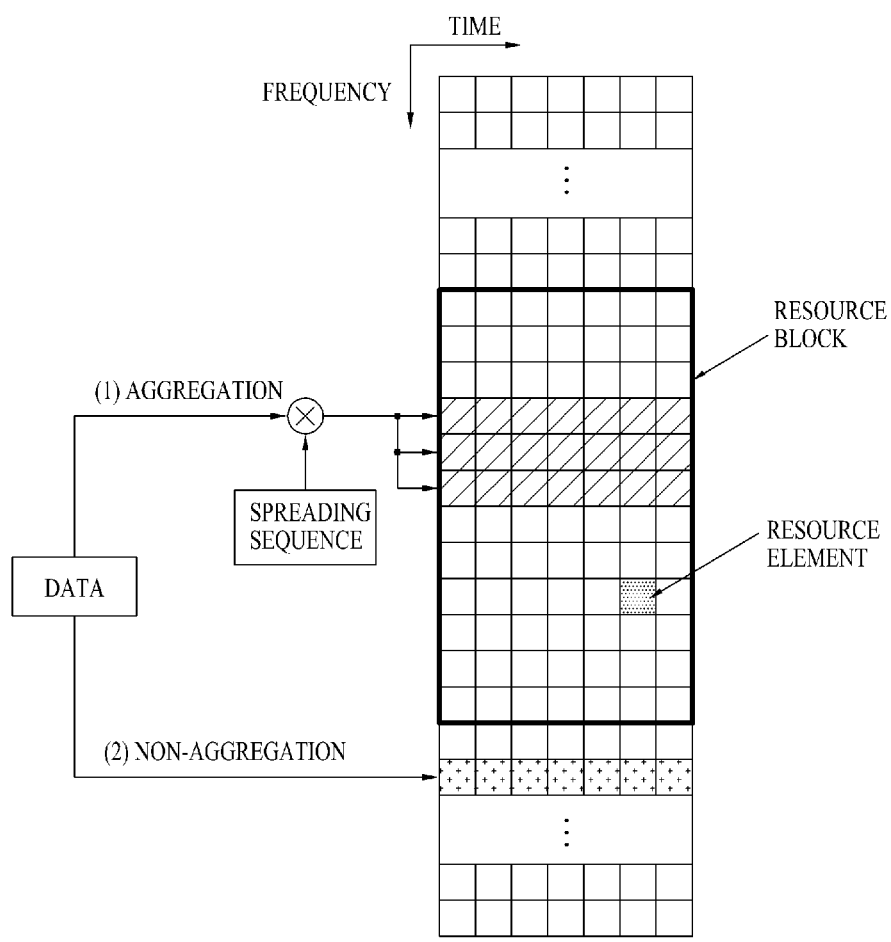
FIG. 4 illustrates radio resources used in an OFDMA system and an example of applying aggregation to the radio resources.
Figure 6:
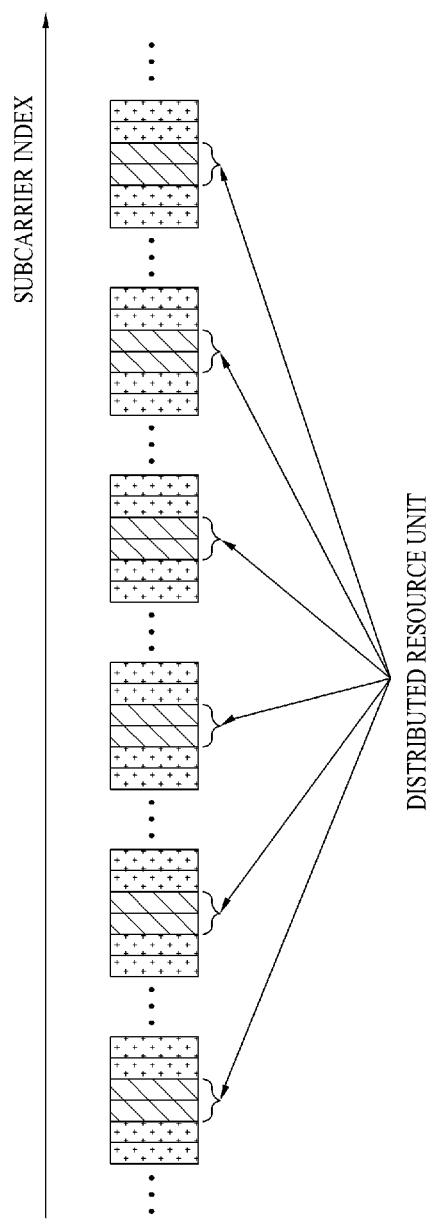
FIG. 6 illustrates an exemplary structure of radio resources for applying aggregation in case of a distributed resource allocation scheme.

To measure a channel through aggregation, the system should use radio resources according to a predetermined rule. For example, a serving cell should allocate frequency resources in groups each including P subcarriers. With reference to FIGS. 4, 5 and 6, a radio resource using rule will be described in detail.

FIG. 4 illustrates radio resources used in an OFDMA system and an example of applying aggregation to the radio resources.

Referring to FIG. 4, the horizontal axis represents time and the vertical axis represents frequency. Each small box represents a resource element composed of time/frequency resources. A bold box represents a resource allocation unit with a predetermined number of subcarriers by a predetermined number of OFDMA symbols. Different systems use different resource allocation units. For example, a 3GPP LTE ($3^{rd}$ generation partnership project Long term evolution) system uses a resource allocation unit with 12 subcarriers. In an IEEE 802.16 system, the resource allocation unit includes 3, 6 or 18 subcarriers. Therefore, when the 3GPP or IEEE 802.16 system adopts aggregation, it preferably defines an aggregation unit within each resource allocation unit. For instance, since the resource allocation unit includes 12 subcarriers in the 3GPP LTE system, the 12 subcarriers may be aggregated by twos and thus 6 transmission signals may be transmitted on the aggregated subcarrier pairs. Alternatively, the 12 subcarriers may be aggregated by threes and thus 4 transmission signals may be transmitted on the aggregated subcarrier groups. If the resource allocation unit includes 18 subcarriers in the IEEE 802.16 system, the 18 subcarriers may be aggregated by twos or threes and thus 9 or 6 transmission signals may be transmitted on the aggregated subcarrier groups.

FIGS. 5($a$) and 5($b$) illustrate exemplary radio resource structures when aggregation is used. In FIGS. 5($a$) and 5($b$), a channel measurement unit includes 12 subcarriers.

Referring to FIG. 5(a), when P=2, the available subcarriers of the channel measurement unit are paired and transmission signals are allocated to the subcarrier pairs. Similarly, if P=3, the available subcarriers of the channel measurement unit are grouped by threes and transmission signals are allocated to the subcarrier groups. If P is 4 or larger, subcarrier aggregation is performed in a similar manner. A transmission signal covered with a masking sequence is carried on a plurality of subcarriers divided into groups each including P subcarriers. In FIG. 5(a), P aggregated subcarriers (subcarriers marked in the same hashing pattern) are contiguous in the frequency domain. In FIG. 5(b), when P=3, P aggregated subcarriers are distributed in the frequency domain. $a_2$-$a_1$-$a_0$, $b_2$-$b_1$-$b_0$, $d_2$-$c_1$-$c_0$ and $d_2$-$d_1$-$d_o$ are subcarriers aggregated by threes, on which transmission signals are separately delivered. Referring to FIG. 5(b), it is noted that three aggregated subcarriers are distributed with a spacing of 4 subcarriers in the frequency domain. While all of subcarrier groups each including aggregated subcarriers are shown in FIG. 5(b) as distributed across a frequency area, some subcarrier groups may be positioned so that aggregated subcarriers are contiguous, while the other subcarrier groups may be positioned so that aggregated subcarriers are distributed. When aggregated subcarriers are distributed, some subcarriers may be contiguous, whereas the other subcarriers may be distributed. For instance, another group of aggregated subcarriers may be interposed between aggregated subcarriers (e.g. $a_2$-$a_1$-$b_2$-$b_1$-$b_0$-$a_0$).

As described above, if a serving cell uses subcarrier aggregation to reduce/cancel inter-cell interference, it is preferred that at least one neighbor cell uses subcarrier aggregation. For instance, when the serving cell aggregates P subcarriers, the at least one neighbor cell preferably allocates radio resources in units of P aggregated subcarriers. In this case, the serving cell and the at least one neighbor cell should use different masking sequences. As P subcarriers are aggregated in this manner, channel measurement is possible through aggregation between adjacent cells.

The examples of FIGS. 5(a) and 5(b) can be easily implemented in case of localized resource allocation. On the other hand, when a resource allocation unit is defined in case of distributed resource allocation, it is appropriate to distribute subcarriers in groups each having P subcarriers to a frequency band.

FIG. 6 illustrates an exemplary structure of radio resources for applying aggregation in case of a distributed resource allocation scheme. In FIG. 6, aggregated subcarriers are marked in the same hashed pattern. Referring to FIG. 6, a resource allocation unit includes 12 subcarriers. If P=2, the 12 subcarriers are paired by twos and distributed across a frequency band. Likewise, when 18 subcarriers are distributed across the frequency band, 9 or 6 subcarrier groups each including two or three consecutive subcarriers may be distributed across the frequency band.

When a subcarrier group is defined, taking account into aggregation of radio resources, the subcarrier group may be defined only for a certain area of a total system bandwidth. In case of localized allocation, for example, aggregation may be defined only for a band sharable with another cell. In case of distributed allocation, subcarrier aggregation may also be defined only when corresponding resources can be shared with a neighbor cell.

One or more cells may be neighbor cells. The neighbor cells may refer to small-sized cells such as relays or femto cells.

Figure 7:
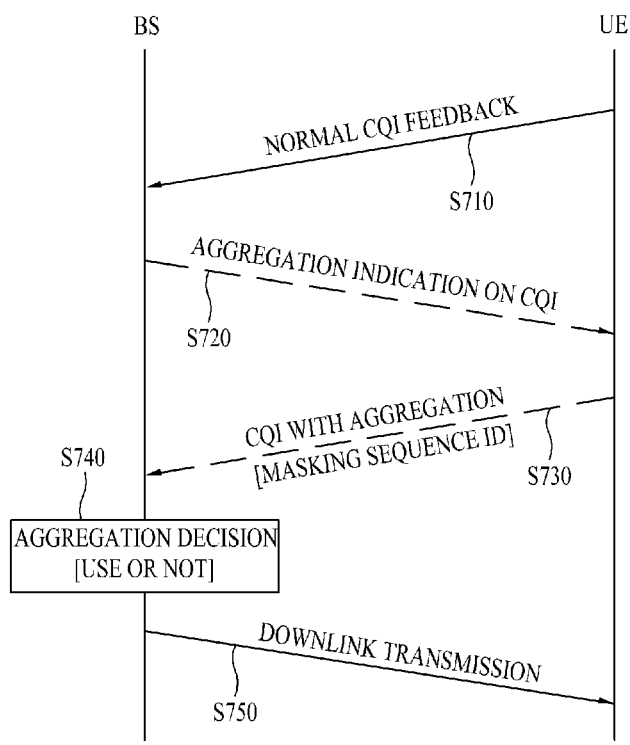
FIG. 7 is a diagram illustrating a signal flow for an exemplary operation for determining a transmission mode at a transmitter according to an embodiment of the present invention.

FIG. 7 is a diagram illustrating a signal flow for an exemplary operation for determining a transmission mode at a transmitter according to an embodiment of the present invention. A part for controlling a signal transmission mode should determine a transmission mode using CQIs. If the system uses a frequency reuse factor of 1, a scheduler considers a transmission mode as well as allocates radio resources to a UE.

Referring to FIG. 7, the UE transmits a normal CQI measured on a subcarrier basis to a BS (S710). While a CQI is taken as an example of feedback information, the UE may transmit at least one of an SINR, an SIR, an SNR, and an MCS table index along with the CQI or instead of the CQI. The BS may determine whether to transmit a transmission signal on a subcarrier basis or to spread the transmission signal with a spreading sequence and transmit the spread signal in units of a predetermined number of subcarriers, referring to the received CQI information and information illustrated in FIG. 2. Referring to FIG. 2 again, if P=2, a gain may be obtained in an entire SNR area. A gain may be obtained at an SNR of about −10 dB for P=3, at an SNR of about 1 dB for P=4, at an SNR of about 6 dB for P=5, and at an SNR of about 10 dB for P=6. The BS may determine whether to use aggregation based on the above capacity analysis.

To more accurately determine a transmission mode for increasing channel capacity, the BS may need to receive a CQI measured by applying aggregation (hereinafter, referred to as an aggregation CQI) from the UE. Therefore, the BS may transmit a message indicating aggregation CQI feedback to the UE (S720). In another embodiment, the UE may automatically measure an aggregation CQI, when needed. In this case, step S720 may be omitted.

Upon receipt of the message indicating aggregation CQI feedback from the BS, the UE applies a masking sequence to a predetermined number of subcarriers, measures a CQI on the subcarriers, and feeds back the CQI to the BS (S730). Alternatively, the UE may autonomously measure an aggregation CQI and feed back the aggregation CQI irrespective of reception of a command from the BS. If the BS can determine whether to apply aggregation simply with the normal CQI received in step S710, step S730 may be omitted. In another example, if the UE is capable of measuring channel state by applying aggregation all the time, a CQI feedback from the UE may be configured to always include an aggregation result. In this case, step S730 may also be omitted. To measure an aggregation CQI, the MS should know a masking sequence or a masking sequence set to be used for CQI measurement. For instance, the UE may automatically set a masking sequence or a masking sequence set according to a predetermined criterion. Alternatively, the BS may notify the UE of a masking sequence or a masking sequence set through coordination with a neighbor cell. If a plurality of masking sequences are available, the UE may measure a CQI over every masking sequence and report a CQI value corresponding to a masking sequence that produces the best result. If the UE measures a CQI using at least two masking sequences, the UE should feed back information about a masking sequence associated with the feedback CQI to the BS. The masking sequence information may include the id of the masking sequence.

Then the BS may determine whether to perform aggregation or change a masking sequence based on the feedback information received from the UE (S740). The feedback information includes at least one of a normal CQI and an aggregation CQI. That is, the BS determines a downlink transmission mode based on the feedback information and transmits a downlink signal to the UE in the determined transmission mode (S750). The transmission mode may be determined through coordination between BSs or without coordination between BSs. In the latter case, each cell may measure an aggregation CQI and change a masking sequence independently. In this case, if a particular BS applies aggregation to a particular UE or frequency band or releases the aggregation from the particular UE or frequency band, the post-change effect is not applied to other BSs in real time. Accordingly, without coordination between BSs, aggregation CQI information is preferably used after a neighbor cell completely adapts to aggregation information for a corresponding frequency band.

Figure 8:
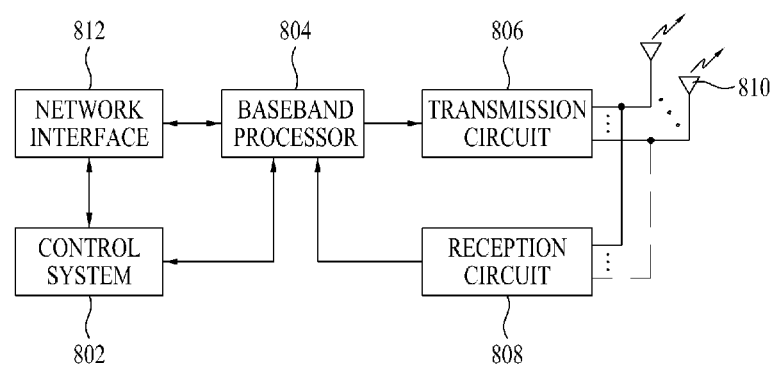
FIG. 8 is an exemplary block diagram of a BS applicable to an embodiment of the present invention.

FIG. 8 is a block diagram of a BS applicable to an embodiment of the present invention.

Referring to FIG. 8, the BS generally includes a control system 802, a baseband processor 804, a transmission circuit 806, a reception circuit 808, multiple antennas 810, and a network interface 812. The reception circuit 808 receives a radio signal from a UE through the multiple antennas 810. Preferably, a low noise amplifier (not shown) and a filter (not shown) amplify the received signal and cancel broadband interference from the amplified signal. A downconversion and digitization circuit (not shown) downconverts the filtered received signal to an intermediate or baseband frequency signal and converts the intermediate or baseband frequency signal to one or more digital streams.

The baseband processor 804 extracts information or data bits from the digital received signal by processing the digital received signal through demodulation, decoding, error correction, etc. The baseband processor 804 is generally configured with one or more DSPs. Then the received information is transmitted over a wireless network or to another UE serviced by the BS, through the network interface. The network interface 812 interacts with a circuit-switched network forming a part of the wireless network that can be connected to a central network controller and a PSTN.

On a transmission side, the baseband processor 804 receives digital data representing voice, data or control information from the network interface 812 under the control of the control system 802 and encodes the digital data for transmission. The encoded data is input to the transmission circuit 806. The transmission circuit 806 modulates the encoded data with a carrier having a desired transmission frequency or desired transmission frequencies. A power amplifier (not shown) amplifies the modulated carrier signal to a power level appropriate for transmission. The amplified signal is transmitted to the multiple antennas 810.

Figure 9:
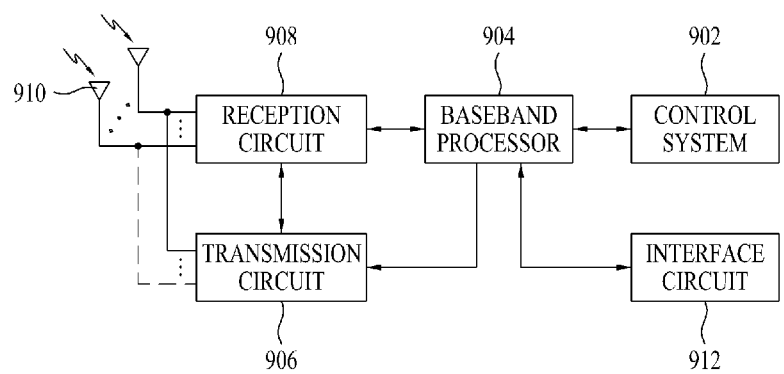
FIG. 9 is an exemplary block diagram of a UE applicable to an embodiment of the present invention.

FIG. 9 is a block diagram of a UE applicable to an embodiment of the present invention.

Referring to FIG. 9, the UE may include a control system 902, a baseband processor 904, a transmission circuit 906, a reception circuit 908, multiple antennas 910, and a user interface circuit 912. The reception circuit 908 receives a radio signal carrying information from one or more BSs through the multiple antennas 910. Preferably, a low noise amplifier (not shown) and a filter (not shown) amplify the received signal and cancel broadband interference from the amplified signal. A downconversion and digitization circuit (not shown) downconverts the filtered received signal to an intermediate or baseband frequency signal and converts the intermediate or baseband frequency signal to one or more digital streams. The baseband processor 904 extracts information or data bits from the digital received signal by processing the digital received signal through demodulation, decoding, error correction, etc. The baseband processor 904 is generally configured with one or more DSPs and ASICs.

On a transmission side, the baseband processor 904 receives digital data representing voice, data or control information from the user interface 812 under the control of the control system 902 and encodes the digital data for transmission. The encoded data is input to the transmission circuit 906. The transmission circuit 906 modulates the encoded data with a carrier having a desired transmission frequency or desired transmission frequencies. A power amplifier (not shown) amplifies the modulated carrier signal to a power level appropriate for transmission. The amplified signal is transmitted to the multiple antennas 910.

Figure 10:
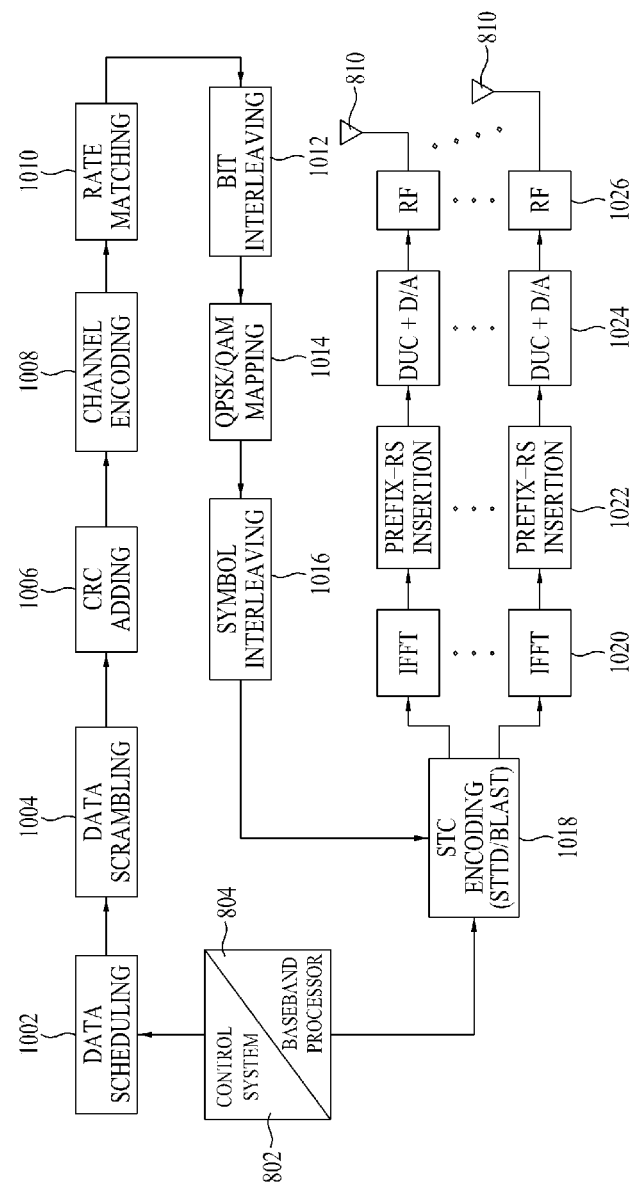
FIG. 10 is an exemplary block diagram of a transmitter applicable to an embodiment of the present invention.

FIG. 10 is an exemplary block diagram of a transmitter applicable to an embodiment of the present invention.

Referring to FIG. 10, while the configuration of the transmitter is described in the context of a BS, it will be understood to those skilled in the art that a structure for uplink and downlink transmission is available as the transmitter. In addition, the transmission structure is intended as, but not limited to, various multiple access structures including CDMA, FDMA, TDMA, and OFDM.

A network initially transmits data for a UE to a BS. A data scrambling module 1004 scrambles a scheduled bit stream in such a manner that the PAPR of the data is reduced. A CRC adding module 1006 adds a CRC (Cyclic Redundancy Check) to the scrambled data. To facilitate data recovery and error correction at the UE, a channel encoder module 1008 performs channel coding. The channel coding effectively adds redundancy to the data. The channel encoder module 1008 may use turbo coding.

A mapping module 1014 systematically maps the processed data bits to corresponding symbols according to a selected baseband modulation scheme which may be QAM or QPSK. Bit groups are mapped to symbols representing positions on an amplitude and phase constellation. Then an STC encoder module 1018 processes symbol blocks. The STC encoder module 1018 processes the symbols according to a selected STC encoding mode and provides N outputs corresponding to the number of the multiple antennas 810 of the BS. An IFFT processing module 1020 converts the symbol stream received from the STC encoder module 1018 to an IFFT signal. Then a prefix and RS adding module 1022 adds a CP (cyclic prefix) and an RS to the IFFT signal. A DUO and D/A conversion module 1024 upconverts the processed signal to an intermediate frequency signal in the digital domain and then converts the digital signal to an analog signal. Subsequently, an RF module 1026 and the multiple antennas 810 modulate, amplify and transmit the analog signal on a desired RF frequency.

Figure 11:
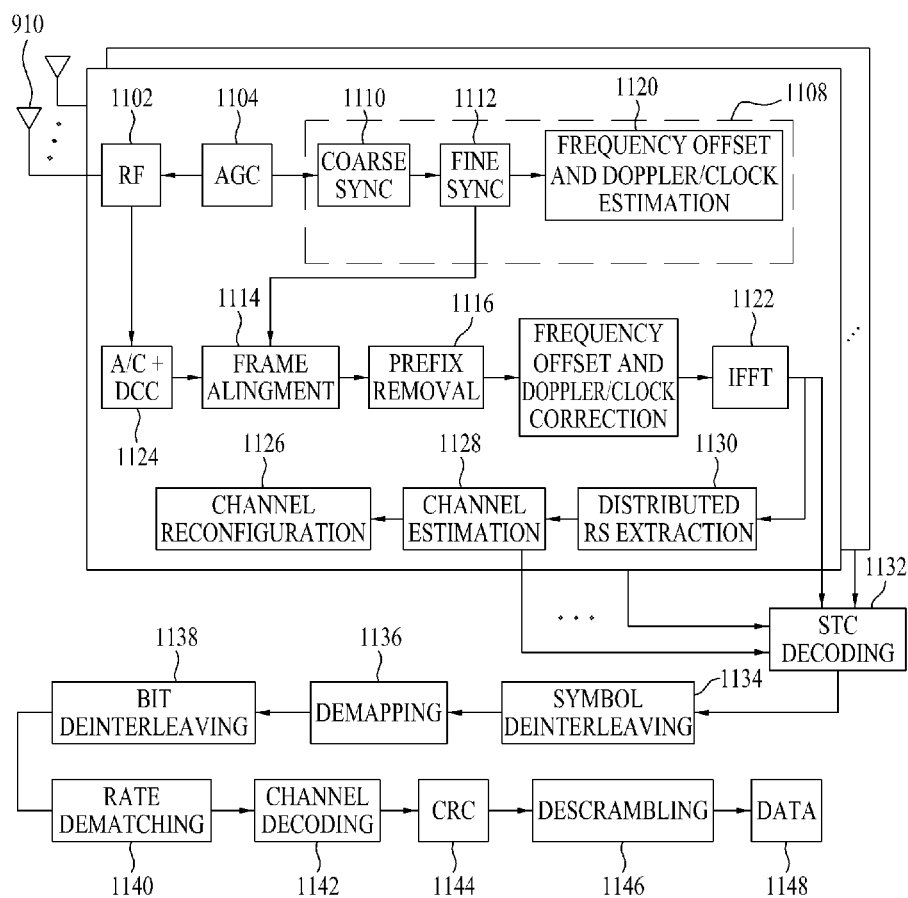
FIG. 11 is an exemplary block diagram of a receiver applicable to an embodiment of the present invention.

FIG. 11 is an exemplary block diagram of a receiver applicable to an embodiment of the present invention.

Referring to FIG. 11, while the configuration of the receiver is described in the context of a UE, it will be understood to those skilled in the art that a structure for uplink and downlink transmission is available as the receiver. Upon receipt of transmission signals at the multiple transmission antennas 910, each of the transmission signals is demodulated and amplified in a corresponding RF module 1102. For the convenience' sake, only one of multiple reception paths at the receiver is shown. An A/D conversion and DCC module 1104 converts the analog signal to a digital signal for digital processing and downconverts the digital signal. An AGC 1106 may use the digital signal so that the RF module 1102 controls the amplification gain of the digital signal based on the level of the received signal. The digital signal is provided to a synchronization module 1108. The synchronization module 1108 may include a coarse sync module 1110 for performing coarse synchronization, a fine sync module 1112 for performing fine synchronization, and a module 1120 for estimating a frequency offset or Doppler effect. The output of the synchronization module 1108 is provided to a frame alignment module 1114 and a frequency offset/Doppler correction module 1118. A prefix removing module 116 removes a CP from an aligned frame. An FFT module 1122 FFT-processes the CP-removed data. An RS extraction module 1130 extracts RSs distributed across the frame and provides the RSs to a channel estimation module 1128. Then a channel reconfiguration module 1126 reconfigures a radio channel using the channel estimation result. The channel estimation provides channel response information enough for an STC decoder 1132 to decode symbols and recover estimates of transmitted bits. Symbols acquired from the received signal and the channel estimation result of each reception path are provided to the STC decoder 1132. The STC decoder 1132 performs STC decoding on each reception path to recover transmitted symbols. The STC decoder 1132 may carry out MLD for BLAST-based transmission. The output of the STC decoder 1132 may be the LLR of each transmission bit. A deinterleaver module 1136 recovers the STC-decoded symbols in the original order. Then a demapping module 1136 and a bit deinterleaver module 1138 map the symbols to a bit stream and deinterleaves the bit stream. A bit stream processed by a rate dematching module 1140 is provided to a channel decoder module 1142 to recover scrambled data and a CRC checksum. The channel decoder module 1142 may use turbo decoding. A CRC module 1144 removes a CRC check sum in a conventional manner and checks the scrambled data. Then a descrambling module 1146 recovers the CRC-checked data to original data 1148.

According to the above-described embodiment of the present invention, despite a frequency reuse factor of 1, cell-edge throughput can be increased. In addition, interference from a neighbor cell can be actively cancelled through aggregation. An MCS table structure supporting a frequency reuse factor of 1 can be provided. Further, overhead required to transmit information for applying aggregation on a control channel can be reduced.

The embodiments of the present invention described above are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. that performs the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication system and, more particularly, to a method for determining a transmission mode in a wireless communication system.

The invention claimed is:

1. A method for reporting a channel state in a wireless communication system, the method comprising:
  receiving downlink signals on a plurality of subcarriers;
  determining first channel state information for the downlink signals by using $$SINR = \sum_{k=0}^{n-1} s_k^2 \bigg/ \sum_{k=0}^{n-1} (I_k^2 + N_k^2);$$

determining second channel state information for the downlink signals by using $$SINR_c = \sum_{k=0}^{n/p-1} \left(\sum_{j=0}^{p-1} c_j s_{kp+j}\right)^2 \bigg/ \sum_{k=0}^{n/p-1} \left(\sum_{j=0}^{p-1} c_j (I_{kp+j} + N_{kp+j})\right)^2;$$

and
  transmitting at least the first channel state information or the second channel state information,
  wherein $s_x$ represents a signal strength of a subcarrier x, $I_x$ represents an interference strength on the subcarrier x, $N_x$ represents a noise strength on the subcarrier x, k is an integer greater than or equal to 0, $c_j$ represents a j-th element of a length-p masking sequence, p is an integer greater than or equal to 2, and j is an integer ranging from 0 to (p−1).

2. The method according to claim 1, wherein a predetermined number of subcarriers belong to a predetermined frequency band commonly used or commonly usable between cells, wherein the predetermined number is equal to p.

3. The method according to claim 1, wherein p is 2 to 6.

4. The method according to claim 1, wherein subcarriers are grouped into subcarrier groups each including p subcarriers and at least two subcarrier groups are contiguous or distributed in the frequency domain.

5. The method according to claim 1, wherein the length-p masking sequence includes an orthogonal sequence and a pseudo noise sequence.

6. The method according to claim 1, wherein the length-p masking sequence is a cell-specific sequence.

7. The method according to claim 1, wherein the second channel state information is determined by using at least two length-p masking sequences.

8. The method according to claim 1, wherein each of the first channel state information and the second channel state information includes at least a CQI (channel quality indicator), an SINR (signal to interference and noise ratio), an SIR (signal to interference ratio), an SNR (signal to noise ratio), or an MCS (modulation and coding scheme) table index.

* * * * *